United States Patent [19]

Lange

[11] 4,265,464
[45] May 5, 1981

[54] TRACTOR DRAFT LINK STRUCTURE

[75] Inventor: Henry J. Lange, Juneau, Wis.

[73] Assignee: Deere & Company, Moline, Ill.

[21] Appl. No.: 67,230

[22] Filed: Aug. 17, 1979

[51] Int. Cl.³ .................................................. B60D 1/16
[52] U.S. Cl. ................................. 280/460 A; 172/450;
403/122; 403/128; 403/131
[58] Field of Search .......... 280/460 A, 461 A, 490 A;
172/450, 439; 403/122, 131, 128

[56] References Cited

U.S. PATENT DOCUMENTS

| | | | |
|---|---|---|---|
| 2,640,708 | 6/1953 | Fraga | 172/450 |
| 2,653,825 | 9/1953 | Collins | 280/33.44 |
| 2,698,564 | 1/1955 | Sawyer | 280/461 A |
| 3,003,790 | 10/1961 | Brown | 280/415 A |
| 3,056,458 | 10/1962 | Gray | 172/450 |
| 3,207,529 | 9/1965 | Harper | 280/460 A |
| 3,387,862 | 6/1968 | Plate | 280/461 A |
| 3,425,715 | 2/1969 | Weitz | 280/460 A |

FOREIGN PATENT DOCUMENTS

| | | | |
|---|---|---|---|
| 251936 | 1/1967 | Austria | 172/450 |
| 647622 | 12/1950 | United Kingdom | 172/450 |

*Primary Examiner*—John P. Silverstrim

[57] ABSTRACT

A stabilizer rod and lower draft link are supported on opposite ends of a common supporting pin on a tractor with each being carried thereon by a ball and socket joint. The stabilizer rod and draft link converge rearwardly. The rod is provided with external threads on its rear end portion. A ball and socket joint is fixed to the draft link and the threaded portion of the rod extends through the ball portion of the joint. Nuts are provided on opposite sides of the ball and may be adjusted axially along the rod for varying the amount of sway of the respective draft link or for locking the draft link entirely against sway.

5 Claims, 2 Drawing Figures

TRACTOR DRAFT LINK STRUCTURE

BACKGROUND OF THE INVENTION

Present-day tractors normally have hitch devices at their rear ends that connect to an implement to be pulled or operated. The hitch device conventionally consists of two lower links that project rearwardly from the tractor and have their forward ends pivotally mounted on the tractor so that the links may be raised and lowered. The rear ends of the links are the connecting points to the trailing implement. Some type of hydraulic system is utilized to raise and lower the links so that the implement may be raised and lowered in total or in part. The lower links are also mounted at their forward ends on tractors, generally about a fully articulated joint, so that the links may sway laterally. In order to limit the amount of sway of these links there is often provided anti-sway devices which may consist merely of a rod or a chain that extends from the tractor and connects to the link. If it is desired to permit sway of the bar and consequently the trailing implement, the rod or chain is disconnected from either the tractor or link. If it is desired to prevent or stop sway of the link, in the case of a rod, it is connected to both the tractor and link. In the case of the chain, it extends between the tractor and link in a taut disposition. Many instances where a rod is used as the anti-sway device, it may be of an extendable and retractable type so as to properly position the link at its preferred position.

In more recent years, small tractors generally referred to as the "lawn and garden" variety have become popular. Generally, these are small horsepower tractors that do not require the overall heavy-duty work of the conventional-type tractor. In comparison to the farm or industrial-type tractor, they are, of course, relatively low priced. Consequently, simplicity in the design of the tractor becomes important so as to maintain the low overall cost of manufacture. Therefore, the anti-sway structure on such a tractor must be simple and low priced. Also, due to the small size of the tractor, it often becomes difficult to find correct locations for anti-sway rods or chains to extend between the tractor and the draft link.

SUMMARY OF THE INVENTION

With the above in mind, it is the primary object of the present invention to provide a relatively simple and low-cost, lower link structure that has an anti-sway rod associated therewith. The inner connection between the rod and lower link is such that the effective length of the rod may be adjusted so as to both limit the amount of sway of the link and to totally lock the link against lateral sway.

More specifically, it is the object of the present invention to provide a lower link structure of a tractor hitch in which both the link and anti-sway rod is supported on opposite ends of a single transverse pin by means of ball and socket joints that permit free articulation of the respective lever and link. The pin is supported imtermediate of its ends on the tractor frame. A ball and socket joint connects the rear end of the anti-sway rod and an intermediate portion of the lift link with the socket being affixed to the link. The ball and socket joint has a diametrically extending opening through which the rear portion of the sway rod extends. The sway rod is threaded at its rear portion and has opposite threaded surfaces extending to opposite sides of the respective ball. Carried on each of the respective threaded surfaces is a special type of nut that includes the basic nut portion and a collar that extends from the nut portion towards the ball. When it is desired to prevent sway of the link, the collars are forced, by threading the respective nuts along the threaded surfaces, into engagement with opposite sides of the ball. When it is desired to permit sway, the respective nuts are threaded away from the ball so that the rod may freely slide in the opening of the ball. Thus, it is possible to determine the amount of sway that the link may have or to lock the link against lateral sway.

DESCRIPTION OF THE PREFERRED EMBODIMENT

Figure 1:
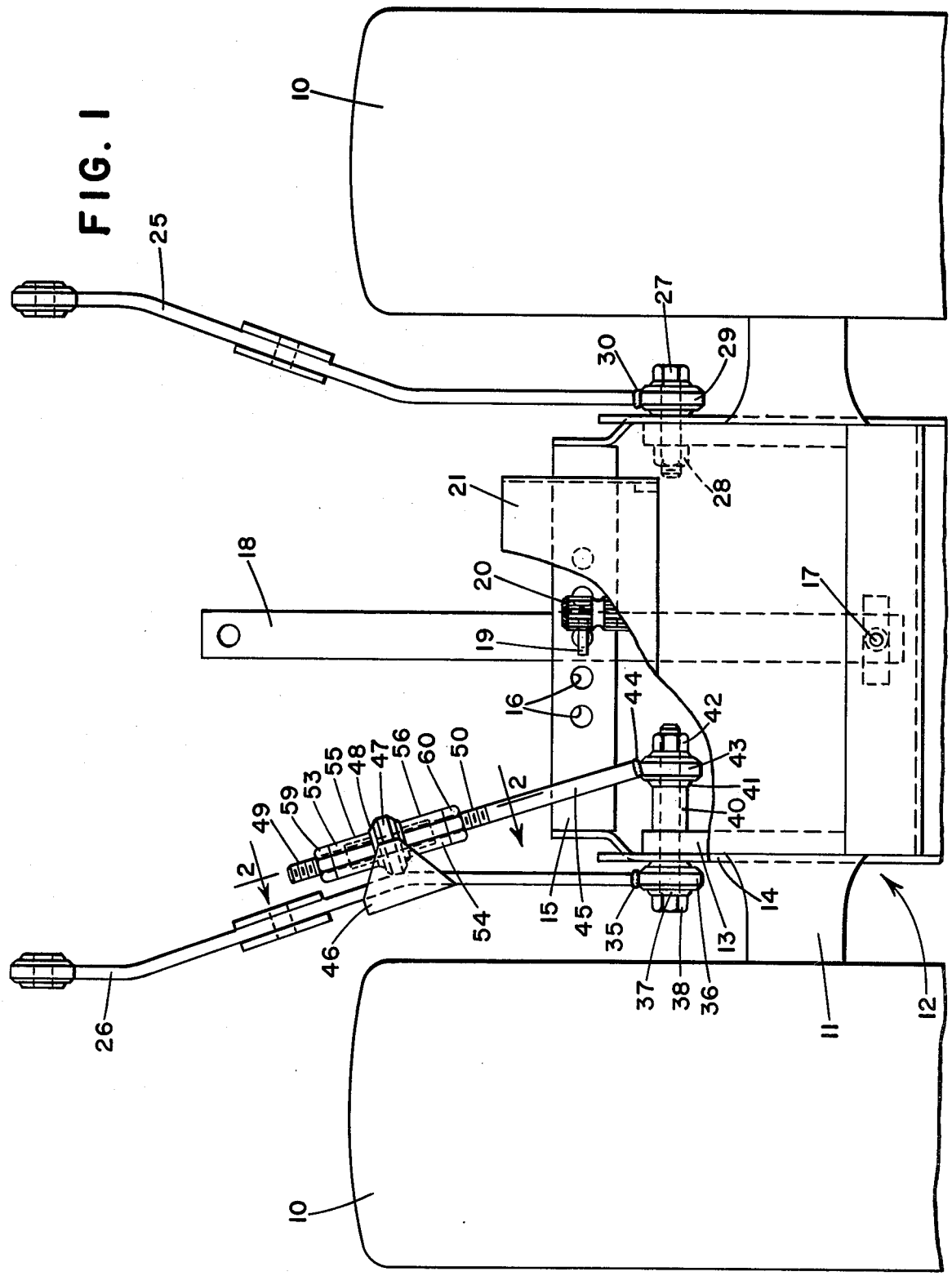
FIG. 1 is a plan view of a rear portion of a tractor having the link structure of the present invention.

Referring to FIG. 1, there is shown the rear portion of a lawn and garden type tractor, having rear traction wheels 10. The traction wheels are carried on opposite ends of an axial structure 11 that extends outwardly from opposite sides of a fore-and-aft extending main frame 12. The frame is composed of a pair of side frame structures, each having a fore-and-aft extending vertical plate 13 which is positioned just inboard of and is fixed to a comparatively thin plate 14. The rear portion of the plate 14 carries a transverse, horizontal plate member 15 having transversely spaced openings 16. The frame 12 also supports on a vertical pivot pin 17 a rearwardly projecting drawbar 18. The drawbar 18 may be free-moving about the axis of the pin 17 or it may be locked into any of several angular positions by dropping pins such as indicated at 19 through respective openings 16 in the plate 15. As is conventional, a power take-off shaft 20 is provided on the rear end of the tractor and is shielded in a conventional matter by shield 21.

The tractor has a hitch device composed, in part, of left and right-hand draft links 25, 26. The left-hand draft link 25 is supported on the frame 12 by means of a bolt 27 that extends through the respective plates 13, 14 on the left-hand side of the tractor. As may be seen, the bolt 27 has a nut 28 that bears against the inner side of the plate 13. Carried on the bolt 27 is a ball and socket joint 29, the ball portion of which is held regid on the shank of the bolt 27. The forward end of the link 25 is welded at 30 to the outer surface of the socket portion of the joint 29. Consequently, the link 25 may articulate freely, within limits, about the ball portion of the ball and socket joint 29.

The right-hand link 26 is supported on the right-hand plates 13, 14 of the frames 12. The link 26 has its forward end welded at 35 to the outer surface of a socket 36 that swivels on a ball portion 37 of a ball and socket joint. The ball portion 37 has a diametrical opening, extending in a transverse horizontal direction, that receives the shank of a comparatively long bolt 38 extending first through the ball 37 and then through the respective plates 13, 14. An axially extending spacer 40 is carried on the bolt 38 and has an outer end bearing against the inner surface of plate 13 and an inner end bearing against the outermost surface of a ball 41. The ball 41 also has a diametrically extending opening that receives the inner end portion of the bolt 38. A nut 42 is carried on the threaded innermost end of the bolt 38 and is used to tighten the entire structure carried on the bolt 38 against movement. Carried on the outer surface of the ball 41 is a socket member 43 which has its outer surface welded at 44 to the forward end of an anti-sway rod 45.

Welded to the upper and lower edges of the link 26 are identical, parallel plates 46. The plates project inwardly from the link 26 and overlie and underlie a socket 47 forming part of a ball and socket joint. The socket is welded to the respective plates and to the inner surface of the link 26. Carried internally of the socket 47, is a ball portion 48 of the ball and socket joint which has a fore-and-aft diametric opening for receiving the rod 45. The rod 45 converges with respect to the link 26 at its rear end and the rear portion of the rod 45 has threaded surfaces 49, 50 extending from and to opposite sides of the ball portion 48 of the ball and socket joint.

Figure 2:
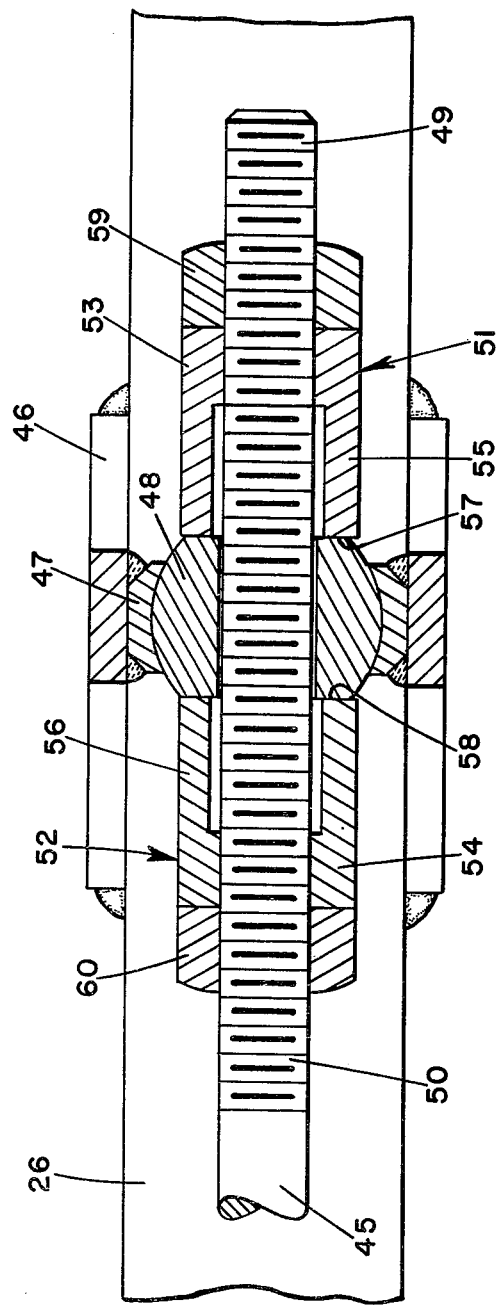
FIG. 2 is a sectional view taken substantially along the line 2—2 of FIG. 1.

Mounted on the two surfaces 49, 50 are a pair of nut members 51, 52 respectively. Referring to FIG. 2, the nut members 51, 52 are composed, in part, of threaded nut portions or ends 53, 54 respectively and integral collar members 55, 56 respectively, that extend from the respective nut portions, in overlying relation to respective portions of the threaded surfaces 49, 50, to ends 57, 58 which may bear against opposite sides of the ball portion 48 of the ball and socket joint. The nut portions 51, 52 may be of hexagonal shape so that wrenches can be applied for adjusting the nut members 51, 52. Lock nuts 59, 60 are provided next to the threaded nut portions 53, 54 for the purpose of locking the nut members 51, 52 against movement.

Referring to the position of the respective nut members 51, 52 as shown in FIGS. 1 and 2, when the ends 57, 58 are tightly set against opposite sides of the ball 48, the rod element 45, pin or bolt 38, and lower link 26 becomes a rigid triangle so as to prevent any sway of the link 26. When the nut members 51, 52 are threaded on the surfaces 49, 50 so that there is space between the ends 57, 58 and the respective sides of the ball 48, there is permitted limited sway of the lower link 26. Thus, sway of the lower link 26 is not only permitted but the amount of sway can be controlled by adjustment of the nuts 51, 52. When the nuts are threaded or spaced away from the ball 48 there will occur some sliding action on the respective threaded surfaces 49, 50 which could create some damage to the threads. The collar portions 55, 56 generally overlie the areas which may be damaged. However, the area of the surfaces 49, 50 on which the nut portions 53, 54 are adjustable are not in contact with the ball 48. Therefore, the nuts will remain relatively easy to adjust. Since the links 25, 26 will at times be required to be attached to implements in which there is some variation between the two attaching points on the implements and the rear ends of the links 25, 26, the adjustability feature of this link structure should be noted. The rear end of the lower link 26 may be adjusted transversely by positioning the nut members 51, 52 at different positions along the threaded portions 49, 50. Should, for example, it be desired to move the rear end of the link 26 more inboardly, the nuts 51, 52 will be threaded towards the front end of the threaded surfaces 49, 50. Likewise, should it be desired to move the connecting point on the link 26 outwardly, the respective nuts 51, 52 may be threaded to the rear most end of the threaded surfaces 49, 50.

I claim:

1. The lower link structure of a tractor hitch comprising: a transverse pivot pin supported intermediate its ends on the tractor; a draft link extending rearwardly from one end of the pin; a rigid stabilizer element extending rearwardly from the opposite end of the pin and converging toward the draft link; ball and socket joints between the ends of the pin and the draft link and the element respectively; a ball and socket structure supported on an intermediate portion of the draft link composed of a socket member fixed to the draft link and a ball freely articulated in the socket member, said ball having a diametrically extending opening for slidably receiving the rearwardly extending element; and an adjustable joint between the ball and rearwardly extending element composed in part of a threaded surface portion on the element with threaded surfaces extending to opposite sides of the ball; a pair of nut members threadedly mounted on the respective threaded surfaces and adjustable therealong, each of said nut members being composed of a threaded nut portion with internal threads carried on the respective threaded surface and a collar extending axially from the nut portion toward the ball to an end that is engageable with the ball, said collar being external of and in protective relation to a portion of the respective threaded surface.

2. The invention defined in claim 1 in which the pivot pin is a bolt extending through a vertical frame section on the tractor, the ball and socket joints are on opposite sides of the frame section, and a spacer is provided on the bolt for additionally spacing the two joints apart.

3. The invention defined in claim 1 in which the balls of the respective ball and socket joints are fixed against movement and the draft link and element are fixed to the respective sockets of the ball and socket joints.

4. The lower link structure of a tractor hitch comprising; a transverse pivot pin supported intermediate its ends on the tractor; a draft link extending rearwardly from one end of the pin; a rigid stabilizer element extending rearwardly from the opposite end of the pin and converging toward the draft link; ball and socket joints between the ends of the pin and the draft link and the element respectively; a ball and socket structure supported on an intermediate portion of the draft link composed of a socket member fixed to the draft link and a ball freely articulated in the socket member, said ball having a diametrically extending opening for slidably receiving the rearwardly extending element; and a joint between the ball and rearwardly extending element for preventing lateral sway of the draft link, said joint being adjustable to permit sway within predetermined limits.

5. The lower link structure of a tractor hitch comprising: a transverse pivot pin supported intermediate its ends on the tractor; a draft link extending rearwardly from one end of the pin; a rigid stabilizer element extending rearwardly from the opposite end of the pin and converging toward the draft link; ball and socket joints between the ends of the pin and the draft link and the element respectively; a ball and socket structure supported on an intermediate portion of the draft link; and a joint between the ball and socket joint structure and rearwardly extending element, said joint being adaptable to releasably lock the element against movement with respect to the link and shiftable along said element to thereby adjust the lateral position of the link.

* * * * *